United States Patent [19]

Ausnit

[11] Patent Number: 5,259,904
[45] Date of Patent: Nov. 9, 1993

[54] OSCILLATING GRIP STRIP FOR RECLOSEABLE PLASTIC BAGS AND METHOD AND APPARATUS FOR MAKING THE SAME

[75] Inventor: Steven Ausnit, New York, N.Y.

[73] Assignee: Minigrip, Inc., Orangeburg, N.Y.

[21] Appl. No.: 880,253

[22] Filed: May 8, 1992

[51] Int. Cl.⁵ .................... B29C 47/18; B31B 1/90
[52] U.S. Cl. .................. 156/244.15; 24/587; 156/66; 156/244.25; 383/65; 493/211; 493/213
[58] Field of Search ............ 156/244.15, 244.25, 156/66; 383/65, 63, 35; 24/587, 576; 493/211–214

[56] References Cited

U.S. PATENT DOCUMENTS

| | | | |
|---|---|---|---|
| 3,198,228 | 8/1965 | Naito | 156/244.15 |
| 3,371,696 | 3/1968 | Ausnit | 24/587 |
| 3,589,958 | 6/1971 | Schrenk | 156/244.15 |
| 3,659,338 | 5/1972 | McFarlane | 156/244.25 |
| 3,780,781 | 12/1973 | Uramoto | 383/65 |
| 4,363,345 | 12/1982 | Scheibner | 24/587 |
| 4,676,851 | 6/1987 | Scheibner | 156/66 |
| 4,755,248 | 7/1988 | Geiger | 156/244.25 |
| 4,842,907 | 6/1989 | Van Erden | 156/66 |
| 5,009,828 | 4/1991 | McCree | 156/244.25 |
| 5,067,822 | 11/1991 | Wirth | 156/66 |
| 5,092,684 | 3/1992 | Weeks | 383/65 |
| 5,121,997 | 6/1992 | La Pierre | 383/65 |

FOREIGN PATENT DOCUMENTS 0089680  9/1983  European Pat. Off. ............. 383/65

*Primary Examiner*—Michael W. Ball
*Assistant Examiner*—Daniel J. Stemmer
*Attorney, Agent, or Firm*—Kane, Dalsimer, Sullivan, Kurucz, Levy, Eisele and Richard

[57] ABSTRACT

A plastic bag with a recloseable zipper-type closure is formed with grip strips on its lips to ease the opening of the bags. The grip strips are extruded from a grip strip extruder which is moved relative to a movement of the zipper type profile to produce a regularly repeating pattern. The strips facilitate opening the bag even with wet or oily fingers. A method and apparatus for forming the same is also disclosed.

10 Claims, 2 Drawing Sheets

OSCILLATING GRIP STRIP FOR RECLOSEABLE PLASTIC BAGS AND METHOD AND APPARATUS FOR MAKING THE SAME

BACKGROUND OF THE INVENTION a. Field of Invention

The present invention relates to recloseable plastic bags, and more particularly to plastic bags having grip strips on their lips to facilitate the handling of the bags.

b. Description of the Prior Art

Plastic bags, and especially plastic bags with a zipper type recloseable closure have gained wide acceptance as a means of shipping and storing foodstuff as well as various other articles. Typically, these types of bags, at their opening end, are provided with two zipper strips. These strips may be formed integrally with the bag body or formed separately and attached to the film which provided the bag body. Each of these strips contains an interlocking profile and a lip disposed outwards of said profile. A problem that sometimes arises with these bags is that since they are typically made of a polyethylene they tend to feel slippery to the touch and as a result the lips are difficult to grip. The problem is somewhat exacerbated, when, as is often the case, the plastic bags are used for foodstuff and other materials used around a house and especially in the kitchen and the user's fingers are wet or oily. In such situations the bag lips become even more slippery and more difficult to handle.

U.S. Pat. No. 5,009,828 discloses a plastic bag having a plurality of parallel ridges on the lips to assist gripping the bag lips. However, these ridges have drawbacks since they extend parallel to the zipper profile and therefore tend to act as rails for a user's fingers rather than to provide a gripping surface. Further, such grip strips ridges are difficult to make, requiring a rather complicated die and head for the extrusion process.

OBJECTIVES AND SUMMARY OF THE INVENTION

In view of the above, it is a principal object of the present invention is to provide a recloseable plastic bag with an effective grip strip on its lips.

A further object is to provide a recloseable bag with grip strips which are convenient to form, utilizing conventional extrusion equipment and using a minimal amount of material.

A still further object is to provide an improved apparatus and method for forming such grip strips.

Other objects and advantages of the invention will become apparent from the following description of the invention.

Briefly, a plastic bag constructed in accordance with the present invention includes two sidewalls with edges and a recloseable zipper consisting of two mating profile strips. The zipper strips are provided with separating lips located between the profiles and the bag sidewall edges. The zipper and lips may be integrally formed with the bag sidewalls or comprise separate strips attached to a film used to form the bag sidewalls. One or more grip strips is extruded onto the lips, by an extruder which is moved relative to a movement of the lips or the sidewalls. By reciprocating the grip strip extruder transverse to the direction of movement of sidewalls an oscillating or generally sinusoidal pattern may be produced to facilitate their grasping and the opening of the bag. Other grip strip patterns may be obtained by utilizing other motions for the grip strip extruder.

DETAILED DESCRIPTION OF THE INVENTION

Figure 1:
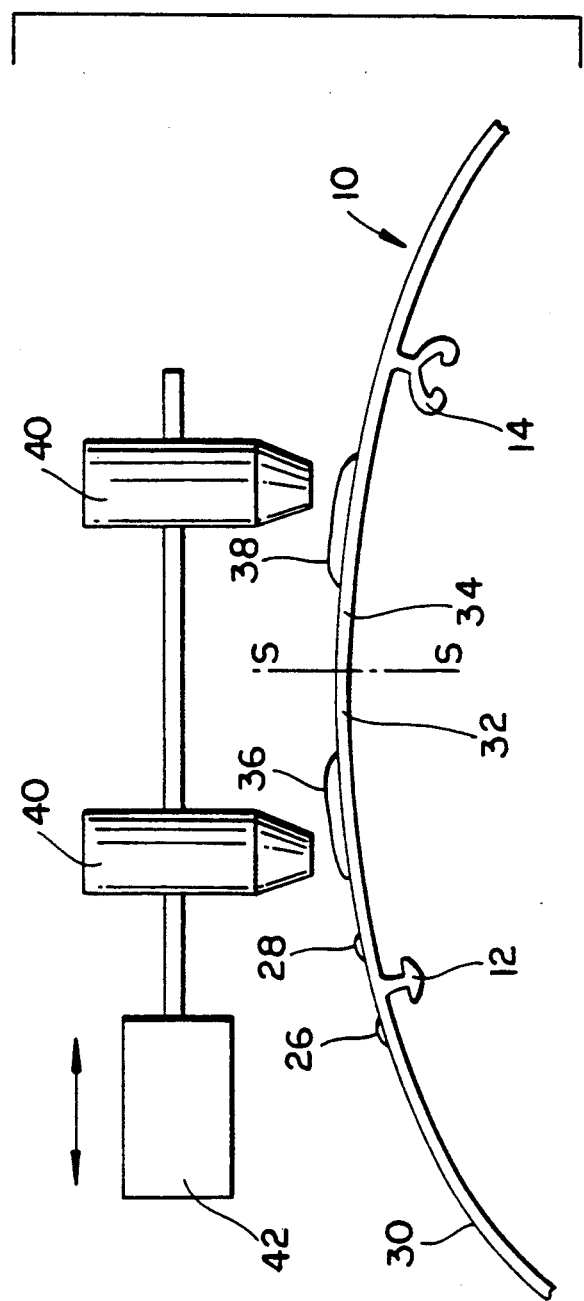
FIG. 1 shows a fragmentary sectional view taken in the direction of extrusion of a plastic profile film material from which recloseable bags may be formed and to which a grip strip is being applied in accordance with the present invention.
Figure 2:
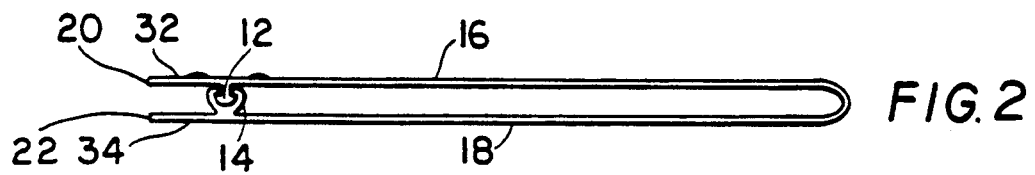
FIG. 2 depicts a side sectional view of a bag formed from the film material of FIG. 1.
Figure 3:
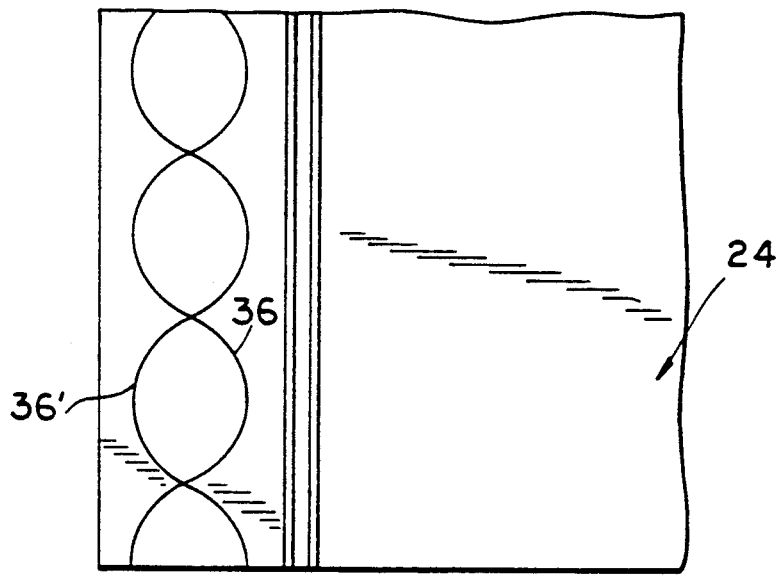
FIG. 3 shows a plan view of the bag of FIG. 2.

As shown in the figures, a typical recloseable plastic bag film 10 is blown or cast to provide the film material which ultimately is formed into recloseable plastic bags. Thus, as shown in FIG. 1 the film 10 is initially blown as a tube with integral male and female profiles 12, 14 formed on the interior surface thereof. As well known in the art, the tube is slit along line S-S between the profiles and collapsed as shown in FIG. 2 with the profiles joined to form two parallel sidewalls 16, 18 carrying profiles 12 and 14 respectively and with the slit line defining top edges 20, 22 for the sidewalls. The profiles 12, 14 then provide the zipper for a recloseable bag 24 formed by slicing and sealing the side edges of an appropriate length of tubing.

In a conventional manner, two parallel ridges 26, 28 are provided on the outer surface 30 of film 10 on opposite sides of the male profile 12. These ridges add support to the profile 12 and also provide a finger guide to aid in closing the bag ultimately formed from the tubing. Similar ridges may be provided on opposite sides of the female profile 14. The portions of the film 10 extending between the profiles 12, 14 to the edges 20, 22 defined by the slit line S-S form two lips 32, 34 for the recloseable bag formed from the film. Thus, the bag is opened by gripping each lip 32, 34 and separating them thereby disengaging the profile members 12, 14.

Figure 4:
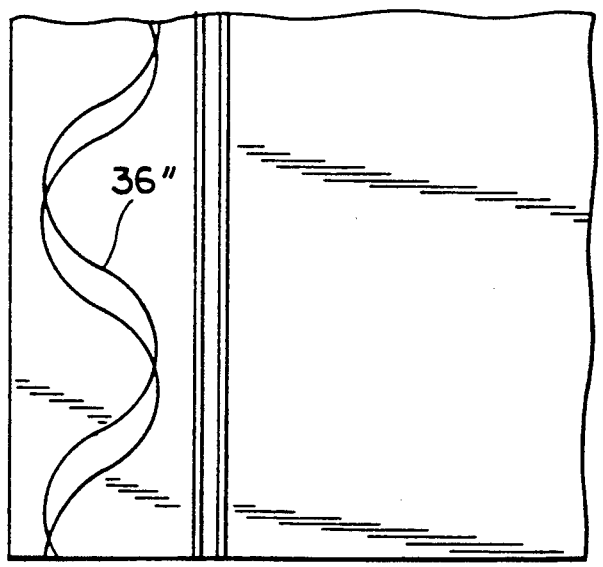
FIG. 4 shows an alternate embodiment of the invention.

As explained above, the plastic material from which the film 10 is extruded is usually polyethylene which has a slippery feel tending to make it difficult to grip and separate the lips 32, 34, especially with wet or oily fingers. In order to alleviate this problem, in accordance with the present invention undulating or oscillating grip strips 36, 38 are added on the outer surfaces of the film in the region to be formed into lips 32, 34 respectively. Each of these grip strips 36, 38 has a sinusoidal shape so that it oscillates back and forth between one or both of the profiles 12 and 14 and the respective edges 20, 22 of the bag. Grip strips 36, 38 provide sufficient resistance to slippage to enable a person to open the bag 10 easily even with wet or oily fingers. If necessary, each lip may be provided with a second sinusoidal grip strip. As shown in FIG. 2, this second strip 36' may be formed so it is out of phase from strip 36 by 180°. Alternatively, a second grip strip 36" may be provided which is out of phase or longitudinally offset from strip 36 by any arbitrary angle, as shown in FIG. 4.

The grip strips 36, 38 may readily be extruded onto the bag forming film by separate reciprocating extruder head output nozzles 40 in line with the extrusion equipment. Alternatively, in flat sheet extrusion it may be desireable to have the sheet pass beneath separate reciprocating extruder head nozzles 40 to obtain the desired grip strips. In such an instance, the grip strips will be on the same side as the profiles, or the inner surface of the film, and will provide the additional advantage of keeping the lips separated from each other so that they may be more easily grasped.

As shown in FIG. 1, for this purpose a pair extrusion heads are disposed with their output nozzles 40 spaced apart from the film 10 in the region of lips 32 and 34. The output nozzles 40 are coupled to a reciprocating mechanism 42 which moves the nozzles 40 transverse to the direction of extrusion of the tube 10 (which is moving out of the paper in FIG. 1) thereby obtaining the desired sinusoidal pattern on the film. As nozzles 40 reciprocate in this manner, they extrude thin streams of plastic material onto the film as shown. Strip 36' (or strip 36") is generated in a similar manner using additional reciprocating extruder head output nozzles as required.

Obviously numerous modifications may be made to the present invention without departing from its scope as defined in the appended claims. For example, more complex patterns may be generated by adding additional extrusion head nozzles and changing the nature of movement of one or more of the extruder head nozzles. Such movements could be towards and away from the zipper film (up and down relative to the film), back and forth in the direction of the zipper film or any combination of these or other movements. Also, the speed of the nozzle movement may be either constant or varied. Also, while the present invention has been described in the context of an integrally formed profile film, the zipper strips and bag body film may be separately formed and then attached to provide the zipper film. That is, the zipper may be in the form of a separately extruded strip to be attached to a separately formed film to provide the stock from which the bags are to be formed. The grip strips may then be applied before or after the zipper strips are attached to the film stock. Additionally, the grip strips may be on the side of the film opposite the profiles as depicted in the preferred embodiment or one or more of the grip strips may be on the same side of the film as the profiles, as indicated, in the case of cast film extrusion. Finally, while the above description contemplates moving the nozzle head to obtain the desired grip strip pattern, in some cases it may be easier to move the film or zipper with respect to the nozzle to obtain the desired pattern. That is, as the film or zipper is moved longitudinally past the nozzle, it may also be reciprocated transversely to obtain the oscillating pattern.

Having thus defined the invention, what is claimed is:

1. In a method of making a plastic bag with grip strips, the improvement comprising the steps of:
   providing a film material with a pair of longitudinally extending mating profiles;
   moving said film material in a first direction;
   extruding a first grip strip on said film material in an area adjacent to at least one of said mating profiles through a first grip strip extruder outlet nozzle; and
   moving with a reciprocating motion transverse to said longitudinally extending mating profiles at least one of said first grip strip extruder outlet nozzle and said film material with respect to the other whereby to provide an undulating pattern to said grip strip on said film material.

2. The method in accordance with claim 1 wherein said first grip strip extruder outlet nozzle is moved with a reciprocating motion in a second direction transverse to the direction of movement of said film.

3. The method in accordance with claim 1 wherein said film material and mating profiles are extruded integrally.

4. The method of claim 1 wherein said first grip strip extruder outlet nozzle is moved with a reciprocating motion and further comprising the step of extruding a second grip strip onto said film through a second grip strip extruder outlet nozzle, and moving said second grip strip extruder outlet nozzle with a motion out of phase with said first grip strip extruder outlet nozzle movement.

5. The method in accordance with claim 4 wherein said first and second grip strips extruder outlet nozzles are longitudinally offset from one another in said first direction.

6. The method in accordance with claim 5 wherein said first and second grip strips are generally sinusoidal and offset from one another by 180°.

7. In a method of making a plastic bag with grip strips, the improvement comprising the steps of:
   providing a zipper material with a pair of mating profiles;
   moving said zipper material in a first direction;
   extruding a first grip strip on said zipper material through a first grip strip extruder outlet nozzle and, additionally moving with a reciprocating motion transverse to said first direction at least one of said first grip strip extruder outlet nozzle and said zipper material with respect to one another whereby to provide a pattern to said grip strip on said zipper material.

8. The method in accordance with claim 7 wherein said first grip strip is disposed between one of said profiles and a line between said mating profiles.

9. The method in accordance with claim 8 further comprising the step of extruding another grip strip through another grip strip extruder outlet nozzle onto said material between said other profile and said line.

10. The method in accordance with claim 9 wherein said first grip strip extruder outlet nozzle and said another grip strip extruder outlet nozzle move together.

* * * * *